US011228667B2

(12) United States Patent
Hong et al.

(10) Patent No.: US 11,228,667 B2
(45) Date of Patent: Jan. 18, 2022

(54) BASE STATION, METHOD, AND DEVICE FOR DATA TRANSMISSION (71) Applicant: BEIJING XIAOMI MOBILE SOFTWARE CO., LTD., Beijing (CN)

(72) Inventors: Wei Hong, Beijing (CN); Li Wang, Beijing (CN); Ming Zhang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 180 days.

(21) Appl. No.: 16/226,631

(22) Filed: Dec. 20, 2018

(65) Prior Publication Data

US 2019/0132427 A1 May 2, 2019

Related U.S. Application Data (63) Continuation of application No. PCT/CN2016/086422, filed on Jun. 20, 2016.

(51) Int. Cl.
*H04L 29/06* (2006.01)
*H04W 88/08* (2009.01)
(Continued)

(52) U.S. Cl.
CPC .......... *H04L 69/08* (2013.01); *H04L 41/044* (2013.01); *H04L 69/24* (2013.01); *H04W 76/15* (2018.02); *H04W 88/08* (2013.01); *H04W 88/10* (2013.01)

(58) Field of Classification Search
CPC ....... H04L 69/08; H04L 41/044; H04L 69/24; H04W 76/15
(Continued)

(56) References Cited

U.S. PATENT DOCUMENTS

2007/0091924 A1* 4/2007 Hsieh .................. H04L 69/32
370/469
2011/0090866 A1 4/2011 Yang
(Continued)

FOREIGN PATENT DOCUMENTS

| CN | 101953204 A | 1/2011 |
|---|---|---|
| CN | 102761904 A | 10/2012 |
| EP | 2880910 A2 | 6/2015 |

OTHER PUBLICATIONS

Ericsson: Tight integration of the New Radio interface (NR) and LTE: User Plane design, 4 pages (Year: 2016).*
(Continued)

*Primary Examiner* — Christopher M Crutchfield
*Assistant Examiner* — Jean F Voltaire
(74) *Attorney, Agent, or Firm* — Arch & Lake LLP (57) ABSTRACT

A Base Station (BS), a method, and device are provided for data transmission. The BS is deployed in a radio access network constructed on the basis of a first mobile communication technology standard. The BS includes: a user plane entity and an aggregation adaptation layer function entity. The user plane entity is configured to receive user plane data in a first format, and send the user plane data in the first format to the aggregation adaptation layer function entity. The aggregation adaptation layer function entity is configured to convert the user plane data in the first format into user plane data in a second format, and send the user plane data in the second format to a BS in a radio access network constructed on the basis of the second mobile communication technology standard.

16 Claims, 5 Drawing Sheets

(51) Int. Cl.
*H04W 76/15* (2018.01)
*H04L 12/24* (2006.01)
*H04W 88/10* (2009.01)

(58) Field of Classification Search
USPC .......................................................... 370/329
See application file for complete search history.

(56) References Cited

U.S. PATENT DOCUMENTS

| | | | |
|---|---|---|---|
| 2011/0142006 A1* | 6/2011 | Sachs ................ | H04W 36/0072 370/331 |
| 2012/0250601 A1* | 10/2012 | Choi ..................... | H04W 88/04 370/315 |
| 2013/0029588 A1* | 1/2013 | Bienas .................. | H04W 48/18 455/7 |
| 2016/0142554 A1 | 5/2016 | Anand | |

OTHER PUBLICATIONS

International Search Report (including English translation) and Written Opinion for PCT/CN2016/086422, dated Mar. 1, 2017, 8 pages.
Tight integration of the New Radio interface (NR) and LTE: User Plane design, 3GPP TSG-RAN WG3 #92, R3-161293, published in May 27, 2016, (4p).
3rd Generation Partnership Project; Technical Specification Group Radio Access Network; Evolved Universal Terrestrial Radio Access (E-UTRA) and Evolved Universal Terrestrial Radio Access Network (E-UTRAN), Overall description; Stage 2(Release 13), 3GPP TS 36.300 V13.3.0, published Apr. 1, 2016, (295p).
First Office Action of the Chinese Application No. 201680000706.5, dated Feb. 2, 2019 and English translation, (18p).
Second Office Action of the Chinese Application No. 201680000706.5, dated Apr. 15, 2019 and English translation, (22p).
Third Office Action of the Chinese Application No. 201680000706.5, dated Jul. 9, 2017 and English translation, (22p).

* cited by examiner

BASE STATION, METHOD, AND DEVICE FOR DATA TRANSMISSION

CROSS-REFERENCE TO RELATED APPLICATION

This is a continuation application of International Patent Application No. PCT/CN2016/086422, filed on Jun. 20, 2016, the entire contents of which are incorporated herein by reference.

TECHNICAL FIELD

The present disclosure relates to mobile communications, and more particularly, to a Base Station (BS) and a method and device for data transmission.

BACKGROUND

A mobile communication network constructed on the basis of a Long Term Evolution (LTE) technology standard has been widely applied. An LTE technology effectively improves a data transmission capability and data transmission speed of a mobile communication network.

Along with continuous development of a mobile communication technology and continuous increase of requirements on a data transmission capability and data transmission speed of a mobile communication network, the next-generation mobile communication technology standard is being discussed by a related organization, such as a 5th Generation (5G) technology standard. How to enable the two different Radio Access Technologies (RATs) of LTE and 5G to transmit user plane data in mutual networks is a problem to be discussed and solved.

SUMMARY

According to a first aspect of the present disclosure, a base station (BS) is provided, which may be deployed in a radio access network constructed on the basis of a first mobile communication technology standard. The BS includes: a user plane entity and an aggregation adaptation layer function entity. The user plane entity may be configured to receive user plane data in a first format, the first format referring to a format specified by the first mobile communication technology standard, and send the user plane data in the first format to the aggregation adaptation layer function entity. The aggregation adaptation layer function entity may be configured to convert the user plane data in the first format into user plane data in a second format, the second format referring to a format specified by a second mobile communication technology standard, and send the user plane data in the second format to a BS in a radio access network constructed on the basis of the second mobile communication technology standard.

According to a second aspect, a method for data transmission is provided, which may be applied to a BS in a radio access network constructed on the basis of a first mobile communication technology standard. The method may include: user plane data in a first format is received, the first format referring to a format specified by the first mobile communication technology standard; the user plane data in the first format is converted into user plane data in a second format, the second format referring to a format specified by a second mobile communication technology standard; and the user plane data in the second format is sent to a BS in a radio access network constructed on the basis of the second mobile communication technology standard.

According to a third aspect, a device for data transmission is provided, which may be applied to a BS in a radio access network constructed on the basis of a first mobile communication technology standard. The device may include: a receiving module, a conversion module, and a sending module. The receiving module is configured to receive user plane data in a first format, the first format referring to a format specified by the first mobile communication technology standard. The conversion module is configured to convert the user plane data in the first format into user plane data in a second format, the second format referring to a format specified by a second mobile communication technology standard. The sending module is configured to send the user plane data in the second format to a BS in a radio access network constructed on the basis of the second mobile communication technology standard.

According to a fourth aspect, a BS is provided, which may be deployed in a radio access network constructed on the basis of a first mobile communication technology standard. The BS may include: a processor; and a memory configured to store instructions executable by the processor. The processor may be configured to: receive user plane data in a first format, the first format referring to a format specified by the first mobile communication technology standard; convert the user plane data in the first format into user plane data in a second format, the second format referring to a format specified by a second mobile communication technology standard; and send the user plane data in the second format to a BS in a radio access network constructed on the basis of the second mobile communication technology standard.

It should be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Figure 1:
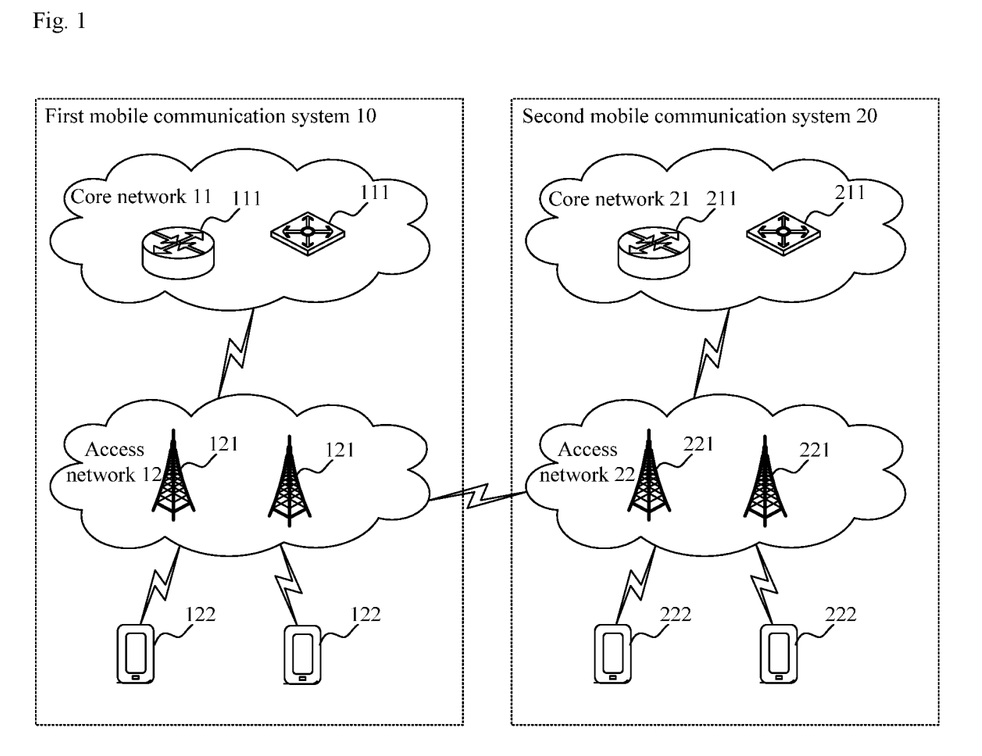
FIG. 1 is a schematic diagram illustrating a network architecture according to an exemplary embodiment.

FIG. 1 is a schematic diagram illustrating a network architecture according to an exemplary embodiment. The network architecture includes: a first mobile communication system 10 and a second mobile communication system 20.

The first mobile communication system 10 is a mobile communication system constructed on the basis of a first mobile communication technology standard. For example, the first mobile communication system 10 is an LTE system. The first mobile communication system 10 includes a core network 11 and an access network 12. The core network 11 includes at least one core network device 111, such as a Mobility Management Entity (MME) or a Serving Gateway (S-GW). The access network 12 includes at least one BS 121. The BS 121 and a terminal 122 communicate with each other by virtue of a certain air interface technology. For example, the BS 121 and the terminal 122 may communicate with each other by virtue of a cellular technology. In the LTE system, the BS 121 and the terminal 122 communicate through a Uu interface. Here, the Uu interface is a radio interface from an eNodeB to a UE.

The second mobile communication system 20 is a mobile communication system constructed on the basis of a second mobile communication technology standard. For example, the second mobile communication system 20 is a 5G communication system. Similar to the first mobile communication system 10, the second mobile communication system 20 includes a core network 21 and an access network 22. The core network 21 includes at least one core network device 211. The access network 22 includes at least one BS 221. The BS 221 and a terminal 222 communicate with each other by virtue of a certain air interface technology. In the 5G communication system, the air interface technology adopted between the BS 221 and the terminal 222 is specified by 5G technology standard, which is not limited in the present disclosure. For example, in the 5G system, a specification of an LTE technology standard may continue to adopt, and the BS 221 and the terminal 222 may also communicate through a Uu interface.

The first mobile communication system 10 and the second mobile communication system 20 are systems adopting two different RATs. For example, the first mobile communication system 10 adopts an LTE technology, and the second mobile communication system 20 adopts a next-generation mobile communication technology, such as 5G technology.

In the embodiment of the present disclosure, the terms "network" and "system" are frequently used interchangeably. Those skilled in the art may understand what they mean. A terminal involved in the embodiments of the present disclosure may include various kinds of handheld equipment, vehicle-mounted equipment, wearable equipment, computing equipment or other processing equipment connected to a wireless modem, which have a wireless communication function, various forms of User Equipment (UE), Mobile Stations (MSs) and terminal devices, or the like. In order to facilitate description, the abovementioned equipment is collectively referred to as terminals. A BS involved in the embodiments of the present disclosure is a device deployed in a radio access network and configured to provide a wireless communication function for a terminal. The BS may include various forms of macro BSs, micro BSs, relay stations, access points or the like. In the systems adopting different RATs, a device with a BS function may have different names, and for example, is collectively referred to as an Evolved NodeB (eNB or eNodeB) in an LTE system, and is called a Node B in a 3G communication system. In order to facilitate description, the abovementioned device for providing the wireless communication function for the terminal is collectively referred to as a base station or a BS.

Figure 2:
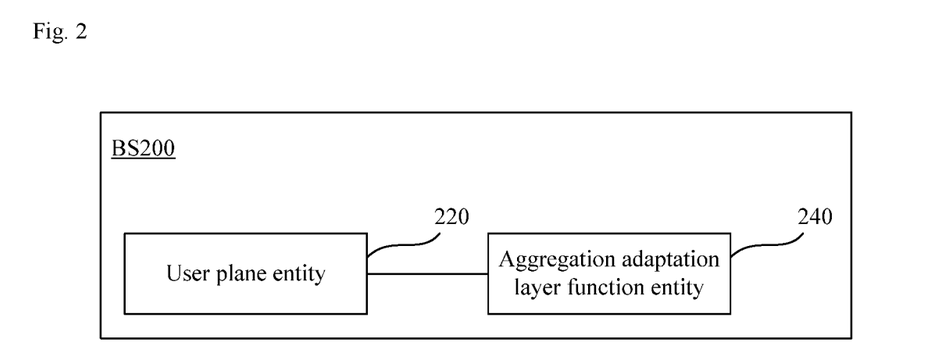
FIG. 2 is a block diagram illustrating a BS according to an exemplary embodiment.

FIG. 2 is a block diagram illustrating a BS according to one or more exemplary embodiments. The BS 200 is deployed in a radio access network constructed on the basis of a first mobile communication technology standard, and the BS 200 includes a user plane entity 220 and an aggregation adaptation layer function entity 240.

The user plane entity 220 is configured to receive user plane data in a first format, where the first format refers to a format specified by the first mobile communication technology standard. The user plane entity 220 is further configured to send the user plane data in the first format to the aggregation adaptation layer function entity 240.

The aggregation adaptation layer function entity 240 is configured to convert the user plane data in the first format into user plane data in a second format, where the second format refers to a format specified by a second mobile communication technology standard. The aggregation adaptation layer function entity 240 then sends the user plane data in the second format to a BS in a radio access network constructed on the basis of the second mobile communication technology standard.

From the above, the BS includes the aggregation adaptation layer function entity, which is configured to convert the user plane data in the first format into the user plane data in the second format. Thus, the user plane data may be transmitted in the radio access network constructed on the basis of the second mobile communication technology standard and two different RATs may transmit the user plane data in the mutual networks, thereby effectively aggregating the two networks in a user plane and improving user plane aggregation performance of the two networks.

Figure 3A:
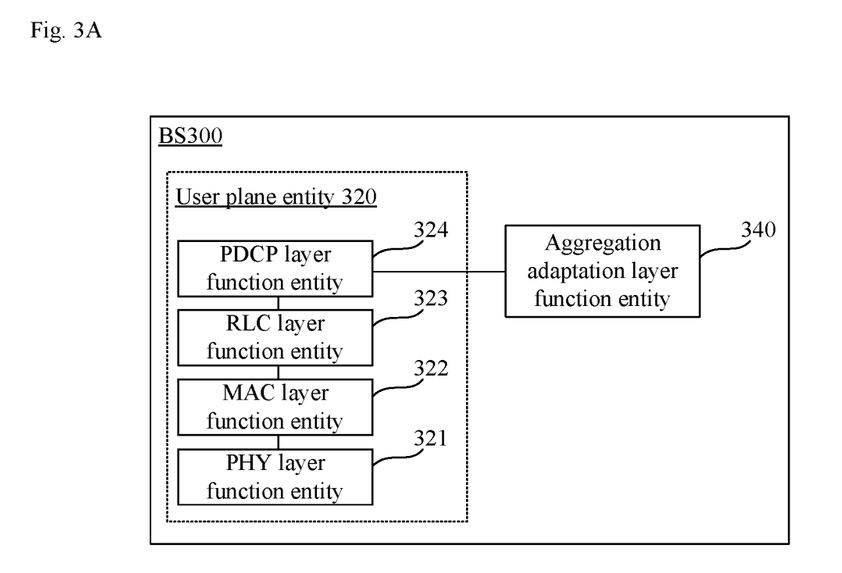
FIG. 3A is a block diagram illustrating a BS according to another exemplary embodiment.

FIG. 3A is a block diagram illustrating a BS according to another exemplary embodiment. The BS 300 is deployed in a radio access network constructed on the basis of a first mobile communication technology standard, and the BS 300 includes a user plane entity 320 and an aggregation adaptation layer function entity 340.

The user plane entity 320 is configured to receive user plane data in a first format, the first format referring to a format specified by the first mobile communication technology standard, and send the user plane data in the first format to the aggregation adaptation layer function entity 340.

Here, the first mobile communication technology standard and second mobile communication technology standard, which are involved, are two different mobile communication technology standards. In an example, the first mobile communication technology standard is an LTE technology standard while the second mobile communication technology standard is 5G technology standard. In another example, the first mobile communication technology standard is the 5G technology standard while the second mobile communication technology standard is the LTE technology standard.

The user plane entity 320 is configured to transmit the user plane data and mainly execute functions of head compression, scheduling, encryption or the like to ensure normal transmission of the user plane data. As shown in FIG.

3A, the user plane entity 320 includes: a physical (PHY) layer function entity 321, a medium access control (MAC) layer function entity 322, a Radio Link Control (RLC) layer function entity 323, and a Packet Data Convergence Protocol (PDCP) layer function entity 324. The PHY layer function entity 321 is configured to process coding and decoding, modulation and demodulation, multi-antenna mapping, and other typical PHY layer functions. The MAC layer function entity 322 is configured to process Hybrid Automatic Repeat reQuest (HARQ) retransmission and uplink and downlink scheduling. The RLC layer function entity 323 is configured for segmentation and connection, retransmission processing and sequential transmission of high-layer data. The PDCP layer function entity 324 is configured to execute head compression, data transmission, encryption and integrity protection. Functions of each layer function entity included in the user plane entity 320 are only simply introduced above, and specific functions may refer to functions realized by each of the abovementioned layer function entities specified in an LTE user plane protocol stack.

In a downlink transmission process, the PDCP layer function entity 324 is configured to receive user plane data in the first format, which is sent by a core network device. The PDCP layer function entity 324 then determines whether it is necessary to transmit the user plane data through a radio access network constructed on the basis of the second mobile communication technology standard or not. If YES, the PDCP layer function entity 324 sends the user plane data in the first format to the aggregation adaptation layer function entity 340.

In an uplink transmission process, the PDCP layer function entity 324 is configured to receive user plane data in the first format, which is sent by a terminal and sequentially transmitted through the PHY layer function entity, the MAC layer function entity, and the RLC layer function entity. The PDCP layer function entity 324 determines whether it is necessary to transmit the user plane data through the radio access network constructed on the basis of the second mobile communication technology standard or not. If YES, the PDCP layer function entity 324 sends the user plane data in the first format to the aggregation adaptation layer function entity 340.

During a practical application, user plane data in a first mobile communication system may be required to be transmitted in a second mobile communication system. For example, the core network device in the first mobile communication system is required to send user plane data to a terminal in the second mobile communication system. For another example, a terminal in the first mobile communication system is required to send user plane data to a core network device in the second mobile communication system. The abovementioned first mobile communication system and second mobile communication system are systems adopting two different RATs, that is, the first mobile communication system is a communication system constructed on the basis of the first mobile communication technology standard, and the second mobile communication system is a communication system constructed on the basis of the second mobile communication technology standard. When determining that the user plane data is required to be transmitted in the second mobile communication system, a BS 300 in the first mobile communication system sends the user plane data to the aggregation adaptation layer function entity 340.

In addition, in the downlink transmission process, the BS may determine whether it is necessary to transmit the user plane data through the radio access network constructed on the basis of the second mobile communication technology standard or not. In one implementation, a receiving terminal corresponding to the user plane data is acquired, it is determined whether the receiving terminal is located in the radio access network constructed on the basis of the second mobile communication technology standard or not. And if YES, it is determined that it is necessary to transmit the user plane data through the radio access network constructed on the basis of the second mobile communication technology standard. For example, a destination Internet Protocol (IP) address may be extracted from a data packet of the user plane data in the first format, and it is determined whether the receiving terminal is located in the radio access network constructed on the basis of the second mobile communication technology standard or not according to the destination IP address.

Similarly, in the uplink transmission process, it may be determined whether it is necessary to transmit the user plane data through the radio access network constructed on the basis of the second mobile communication technology standard or not in a manner as follows: a receiving device (such as the core network device) corresponding to the user plane data is acquired, it is determined whether the receiving device is located in the communication system constructed on the basis of the second mobile communication technology standard or not, and if YES, it is determined that it is necessary to transmit the user plane data through the radio access network constructed on the basis of the second mobile communication technology standard. For example, a destination IP address may be extracted from a data packet of the user plane data in the first format, and it is determined whether the receiving device is located in the communication system constructed on the basis of the second mobile communication technology standard or not according to the destination IP address.

The aggregation adaptation layer function entity 340 is configured to convert the user plane data in the first format into user plane data in a second format, the second format referring to a format specified by the second mobile communication technology standard, and send the user plane data in the second format to a BS in the radio access network constructed on the basis of the second mobile communication technology standard.

Corresponding to the first example mentioned above, when the first mobile communication technology standard is the LTE technology standard and the second mobile communication technology standard is the 5G technology standard, the aggregation adaptation layer function entity 340 may be called a Long Term Evolution-New Radio Aggregation Adaptation (LNAA) layer function entity, and the LNAA layer function entity is configured to convert user plane data in an LTE format into user plane data in a 5G format.

Corresponding to the second example mentioned above, when the first mobile communication technology standard is the 5G technology standard and the second mobile communication technology standard is the LTE technology standard, the aggregation adaptation layer function entity 340 may be called a New Radio-Long Term Evolution Aggregation Adaptation (NLAA) layer function entity, and the NLAA layer function entity is configured to convert user plane data in the 5G format into user plane data in the LTE format.

Different mobile communication technology standards may specify different formats of user plane data. For example, an LTE technology standard and a 5G technology standard may specify different data packet formats of user plane data, including head and body formats. The aggregation adaptation layer function entity 340 is configured to analyze a data packet of the user plane data in the first format to obtain a data content; and package the data content to obtain a data packet of the user plane data in the second format according to the second format. Herein, packaging the data content according to the second format refers to packaging a head and body of the data packet to obtain a data packet consistent with a specification of the second format according to a packet structure specified by the second format.

Figure 3B:
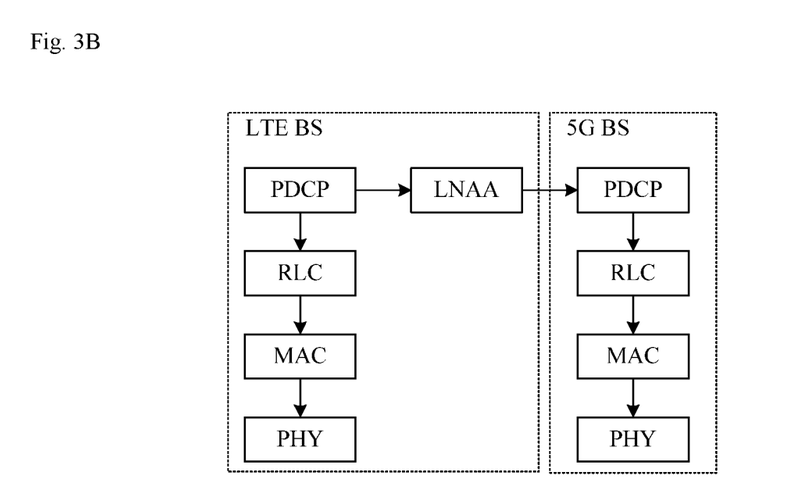
FIG. 3B is a schematic diagram illustrating a user plane network architecture involved in an embodiment shown in FIG. 3A.

As shown in FIG. 3B, for example, in a downlink transmission process, after a BS in an LTE system receives a data packet of user plane data in an LTE format, which is sent by a core network device, a PDCP layer determines whether it is necessary to transmit the user plane data through a 5G network or not, and if YES, the PDCP layer sends the data packet of the user plane data in the LTE format to an LNAA layer function entity. The LNAA layer function entity analyzes the data packet in the LTE format to obtain a data content according to the data format specified by an LTE technology standard, then packages the data content to obtain a data packet in a 5G format according to a data format specified by the 5G technology standard, and sends the data packet in the 5G format to a BS in a 5G system.

Figure 3C:
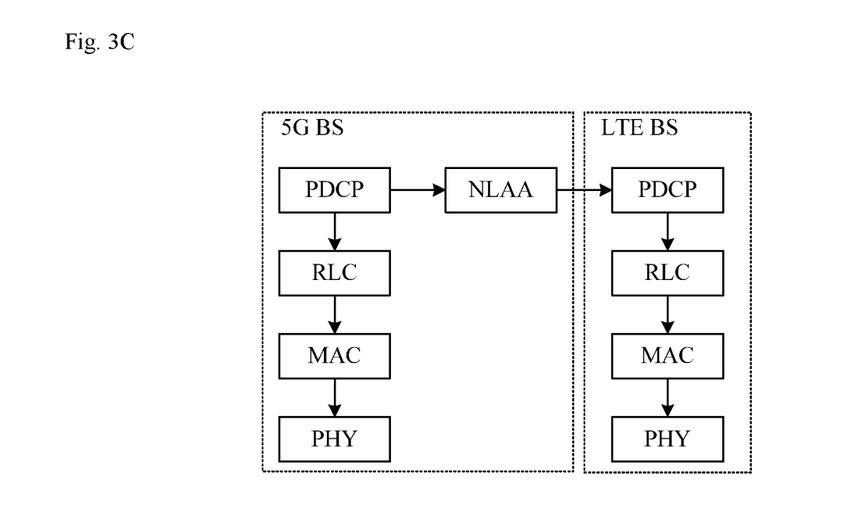
FIG. 3C is a schematic diagram illustrating another user plane network architecture involved in an embodiment shown in FIG. 3A.

As shown in FIG. 3C, for example, still in a downlink transmission process, after a BS in a 5G system receives a data packet of user plane data in a 5G format, which is sent by a core network device, a PDCP layer determines whether it is necessary to transmit the user plane data through an LTE network or not, and if YES, the PDCP layer sends the data packet of the user plane data in the 5G format to an NLAA layer function entity. The NLAA layer function entity analyzes the data packet in the 5G format to obtain a data content according to the data format specified by 5G technology standard, then packages the data content to obtain a data packet in an LTE format according to a data format specified by an LTE technology standard, and sends the data packet in the LTE format to a BS in an LTE system.

From the above, according to the BS provided by the embodiment, the aggregation adaptation layer function entity is additionally deployed in the BS, and is configured to convert the user plane data in the first format into the user plane data in the second format, so that the user plane data may be transmitted in the radio access network constructed on the basis of the second mobile communication technology standard and two different RATs may transmit the user plane data in the mutual networks, thereby effectively aggregating the two networks in a user plane and improving user plane aggregation performance of the two networks.

In addition, the embodiment provides two user plane network architectures, which implement two-way transmission of the user plane data between the LTE system and the 5G system.

The below is a method embodiment of the present disclosure, and details undisclosed in the method embodiment of the present disclosure refer to introductions and descriptions in the abovementioned embodiment.

Figure 4:
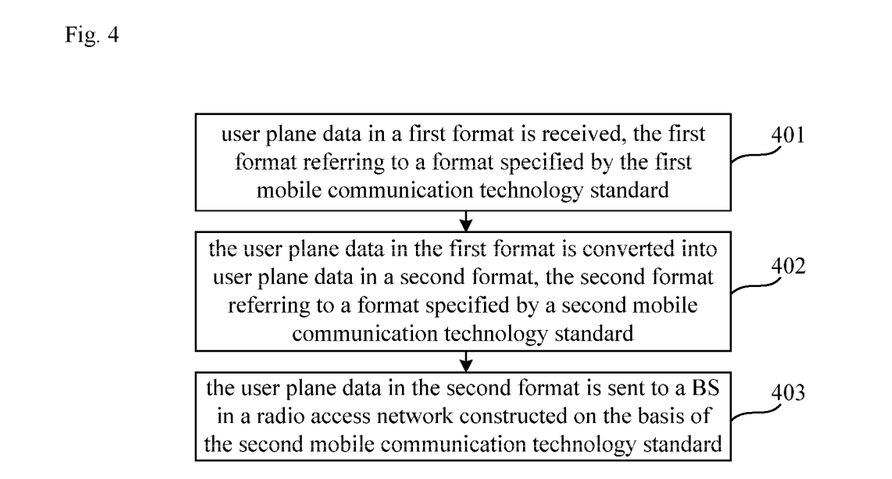
FIG. 4 is a flow chart showing a data transmission method according to an exemplary embodiment.

FIG. 4 is a flow chart showing a data transmission method according to an exemplary embodiment. The method may be implemented by a BS in a radio access network constructed on the basis of a first mobile communication technology standard. The method may include the following steps.

At Step 401, user plane data in a first format is received, the first format referring to a format specified by the first mobile communication technology standard.

In the embodiment of the present disclosure, the first mobile communication technology standard and second mobile communication technology standard, which are involved, are two different mobile communication technology standards. In an example, the first mobile communication technology standard is an LTE technology standard, and the second mobile communication technology standard is 5G technology standard. In another example, the first mobile communication technology standard is the 5G technology standard, and the second mobile communication technology standard is the LTE technology standard.

With reference to the BS shown in FIG. 2 or FIG. 3A, the BS includes a user plane entity and an aggregation adaptation layer function entity. The user plane entity receives the user plane data in the first format, and sends the user plane data in the first format to the aggregation adaptation layer function entity.

Optionally, with reference to the BS shown in FIG. 3A, the user plane entity includes a PHY layer function entity, a MAC layer function entity, an RLC layer function entity and a PDCP layer function entity. In a downlink transmission process, the PDCP layer function entity receives user plane data in the first format, which is sent by a core network device, determines whether it is necessary to transmit the user plane data through a radio access network constructed on the basis of the second mobile communication technology standard or not, and if YES, sends the user plane data in the first format to the aggregation adaptation layer function entity. In an uplink transmission process, the PDCP layer function entity receives user plane data in the first format, which is sent by a terminal and sequentially transmitted through the PHY layer function entity, the MAC layer function entity and the RLC layer function entity, determines whether it is necessary to transmit the user plane data through the radio access network constructed on the basis of the second mobile communication technology standard or not, and if YES, sends the user plane data in the first format to the aggregation adaptation layer function entity.

At Step 402, the user plane data in the first format is converted into user plane data in a second format, the second format referring to a format specified by a second mobile communication technology standard.

The aggregation adaptation layer function entity converts the user plane data in the first format into the user plane data in the second format. Optionally, the aggregation adaptation layer function entity analyzes a data packet of the user plane data in the first format to obtain data content, and packages the data content to obtain a data packet of the user plane data in the second format according to the second format.

Corresponding to the first example mentioned above, when the first mobile communication technology standard is the LTE technology standard and the second mobile communication technology standard is the 5G technology standard, the aggregation adaptation layer function entity may be called an LNAA layer function entity, and the LNAA layer function entity is configured to convert user plane data in an LTE format into user plane data in a 5G format.

Corresponding to the second example mentioned above, when the first mobile communication technology standard is the 5G technology standard and the second mobile communication technology standard is the LTE technology standard, the aggregation adaptation layer function entity may be called an NLAA layer function entity, and the NLAA layer function entity is configured to convert user plane data in the 5G format into user plane data in the LTE format.

At Step 403, the user plane data in the second format is sent to a BS in a radio access network constructed on the basis of the second mobile communication technology standard.

The aggregation adaptation layer function entity sends the user plane data in the second format to the BS in the radio access network constructed on the basis of the second mobile communication technology standard.

From the above, according to the method provided by the embodiment, the user plane data in the first format is converted into the user plane data in the second format, so that the user plane data may be transmitted in the radio access network constructed on the basis of the second mobile communication technology standard and two different RATs may transmit the user plane data in the mutual networks, thereby effectively aggregating the two networks in a user plane and improving user plane aggregation performance of the two networks.

The below is a device embodiment of the present disclosure, which may be configured to execute the method embodiment of the present disclosure. Details undisclosed in the device embodiment of the present disclosure refer to the method embodiment of the present disclosure.

Figure 5:
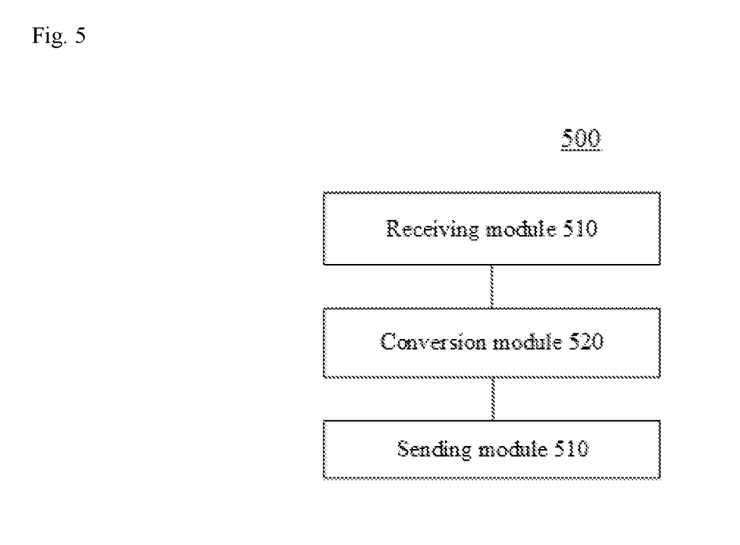
FIG. 5 is a block diagram illustrating a data transmission device according to an exemplary embodiment.

FIG. 5 is a block diagram illustrating a data transmission device according to an exemplary embodiment. The device 500 is applied to a BS in a radio access network constructed on the basis of a first mobile communication technology standard. The device has a function of implementing the abovementioned method, and the function may be realized by virtue of hardware, and may also be realized by virtue of corresponding software executed by hardware. The device 500 may include: a receiving module 510, a conversion module 520 and a sending module 530.

In an exemplary embodiment, the device 500 may be implemented by one or more circuitries, which include Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the above disclosed communication method. The device 500 may use the circuitries in combination with the other hardware or software components for performing the above described methods. Each module, sub-module, unit, or sub-unit in the disclosure may be implemented at least partially using the one or more circuitries.

The receiving module 510 is configured to receive user plane data in a first format, the first format referring to a format specified by the first mobile communication technology standard.

The conversion module 520 is configured to convert the user plane data in the first format into user plane data in a second format, the second format referring to a format specified by a second mobile communication technology standard.

The sending module 530 is configured to send the user plane data in the second format to a BS in a radio access network constructed on the basis of the second mobile communication technology standard.

From the above, according to the device provided by the embodiment, the user plane data in the first format is converted into the user plane data in the second format, so that the user plane data may be transmitted in the radio access network constructed on the basis of the second mobile communication technology standard and two different RATs may transmit the user plane data in the mutual networks, thereby effectively aggregating the two networks in a user plane and improving user plane aggregation performance of the two networks.

In an example, the first mobile communication technology standard is an LTE technology standard, and the second mobile communication technology standard is 5G technology standard.

In another example, the first mobile communication technology standard is the 5G technology standard, and the second mobile communication technology standard is the LTE technology standard.

Figure 6:
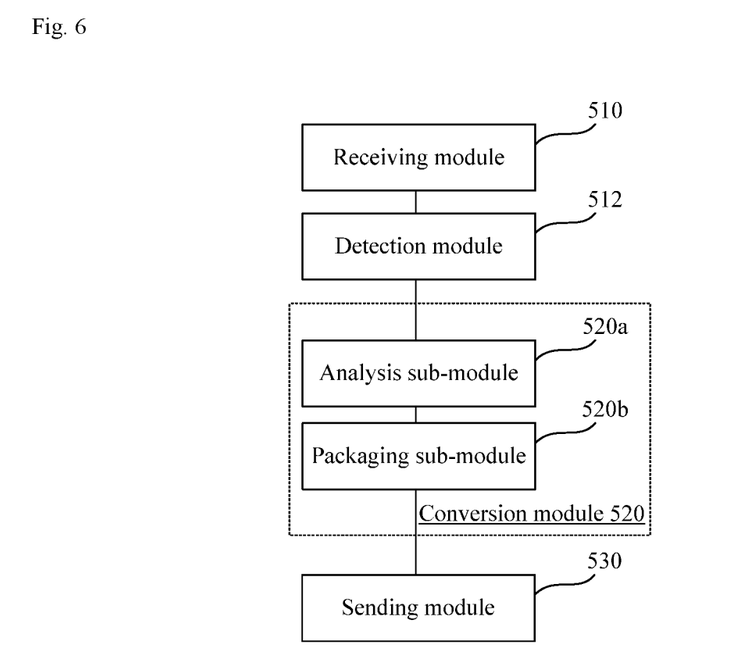
FIG. 6 is a block diagram illustrating a data transmission device according to another exemplary embodiment.

In an optional embodiment provided on the basis of the embodiment shown in FIG. 5, as shown in FIG. 6, the conversion module 520 includes an analysis sub-module 520a and a packaging sub-module 520b.

The analysis sub-module 520a is configured to analyze a data packet of the user plane data in the first format to obtain data content.

The packaging sub-module 520b is configured to package the data content to obtain a data packet of the user plane data in the second format according to the second format.

In another optional embodiment provided on the basis of the embodiment shown in FIG. 5, as shown in FIG. 6, the device further includes a detection module 512.

The detection module 512 is configured to determine whether it is necessary to transmit the user plane data through the radio access network constructed on the basis of the second mobile communication technology standard or not.

The conversion module 520 is further configured to, if a determination result of the determination module is YES, execute the step of converting the user plane data in the first format into the user plane data in the second format.

In another optional embodiment provided on the basis of the embodiment shown in FIG. 5, the receiving module 510 is configured to: receive user plane data in the first format, which is sent by a core network device; or, receive user plane data in the first format, which is sent by a terminal.

It is important to note that the device provided by the abovementioned embodiment is only described with division of the abovementioned function modules as an example when realizing its function. During a practical application, the abovementioned function may be distributed to different function modules for realization according to a practical requirement, that is, a content structure of the device is divided into different function modules to realize all or part of the abovementioned function.

With respect to the devices in the above embodiments, the specific manners for performing operations for individual modules therein have been described in detail in the embodiments regarding the methods, which will not be elaborated herein.

An exemplary embodiment of the present disclosure further provides a BS, the BS is deployed in a radio access network constructed on the basis of a first mobile communication technology standard, and the BS may implement the data transmission method provided by the present disclosure. The BS includes: a processor, and a memory configured to store instructions executable by the processor. The processor is configured to:

receive user plane data in a first format, the first format referring to a format specified by the first mobile communication technology standard;

convert the user plane data in the first format into user plane data in a second format, the second format referring to a format specified by a second mobile communication technology standard; and send the user plane data in the second format to a BS in a radio access network constructed on the basis of the second mobile communication technology standard.

In an example, the first mobile communication technology standard is an LTE technology standard, and the second mobile communication technology standard is 5G technology standard.

In another example, the first mobile communication technology standard is the 5G technology standard, and the second mobile communication technology standard is the LTE technology standard.

Optionally, the processor is configured to: analyze a data packet of the user plane data in the first format to obtain data content; and package the data content to obtain a data packet of the user plane data in the second format according to the second format.

Optionally, the processor is further configured to: determine whether it is necessary to transmit the user plane data through the radio access network constructed on the basis of the second mobile communication technology standard or not; and if YES, execute the step of converting the user plane data in the first format into the user plane data in the second format.

Optionally, the processor is configured to: receive user plane data in the first format, which is sent by a core network device; or receive user plane data in the first format, which is sent by a terminal.

Figure 7:
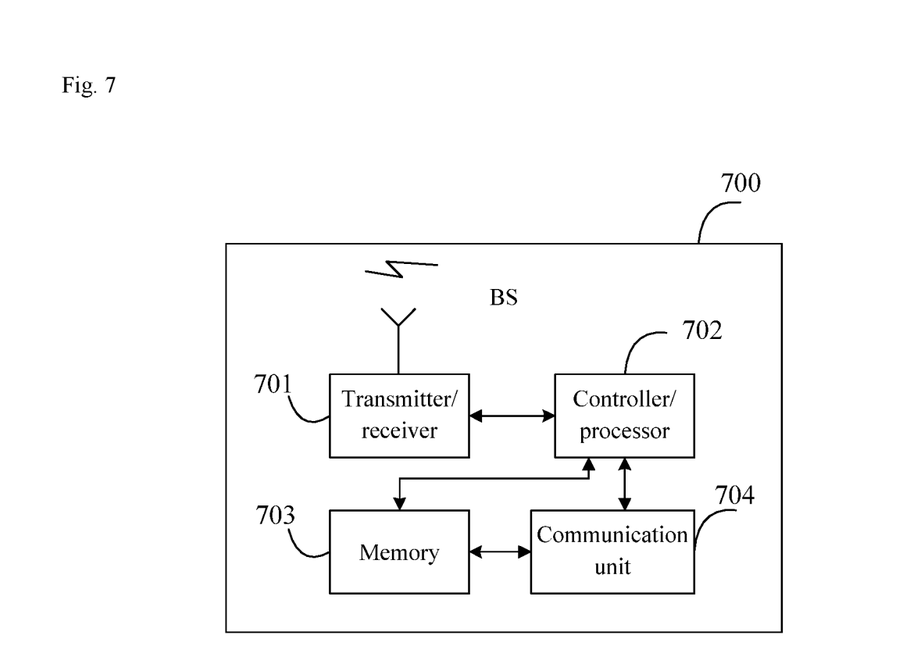
FIG. 7 is a structure diagram illustrating a BS according to an exemplary embodiment.

FIG. 7 is a structure diagram illustrating a BS according to an exemplary embodiment.

The BS 700 includes a transmitter/receiver 701 and a processor 702. The processor 702 may also be a controller, and is represented as "controller/processor 702" in FIG. 7. The transmitter/receiver 701 is configured to support information transmission and reception between the BS and the terminal in the abovementioned embodiments and support radio communication between the terminal and another terminal. The processor 702 executes various functions for communication with the terminal. In an uplink, an uplink signal from the terminal is received through an antenna, is demodulated by the receiver 701 (for example, a high-frequency signal is demodulated into a baseband signal), and is further processed by the processor 702 to recover service data and signaling information sent by the terminal. In a downlink, service data and a signaling message are processed by the processor 702, are modulated by the transmitter 701 to generate a downlink signal (for example, a baseband signal is modulated into a high-frequency signal), and are transmitted to the terminal through the antenna. It is important to note that the abovementioned demodulation or modulation function may also be realized by the processor 702. For example, the processor 702 is further configured to execute Step 401 to Step 403 in FIG. 4, and/or the other steps of the technical solutions described by the embodiments of the present disclosure.

Furthermore, the BS 700 may further include a memory 703, and the memory 703 is configured to store program codes and data of the BS 700. In addition, the BS may further include a communication unit 704. The communication unit 704 is configured to support communication between the BS and another network entity (such as a network device in a core network). For example, in an LTE system, the communication unit 704 may be an S1-U interface, and is configured to support communication between the BS and an S-GW; or, the communication unit 704 may also be an S1-MME interface, and is configured to support communication between the BS and an MME.

It can be understood that FIG. 7 only shows a simplified design of the BS 700. During a practical application, the BS 700 may include any numbers of transmitters, receivers, processors, controllers, memories, communication units or the like, and all BSs capable of implementing the embodiments of the present disclosure fall within the scope of protection of the embodiments of the present disclosure.

The embodiments of the present disclosure further provide a computer storage medium, which is configured to store computer software instructions for the abovementioned BS, including a program configured to execute the abovementioned methods.

It should be understood that "multiple/a plurality of" mentioned in the present disclosure refers to two or more than two. "And/or" describes an association relationship between associated objects, and represents that there may exist three relationships. For example, A and/or B may represent three conditions that: A independently exists, A and B both exist and B independently exists. The character "/" usually represents that the associated objects form an "or" relationship.

The terminology used in the present disclosure is for the purpose of describing exemplary embodiments only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

Other embodiments of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A Base Station (BS), deployed in a radio access network constructed on the basis of a first mobile communication technology standard, and comprising:
   a user plane entity and an aggregation adaptation layer function entity; the user plane entity further comprising: a Physical (PHY) layer function entity; a Medium Access Control (MAC) layer function entity; a Radio Link Control (RLC) layer function entity; and a Packet Data Convergence Protocol (PDCP) layer function entity,
   wherein the user plane entity is configured to:
   receive, by the PDCP layer function entity, user plane data in a first format, the first format referring to a format specified by the first mobile communication technology standard;
   determine, by the PDCP layer function entity, according to a destination Internet Protocol (IP) address extracted from a data packet of the user plane data in the first format, whether a receiving terminal or a receiving device corresponding to the user plane data is located in a radio access network constructed on basis of a second mobile communication technology standard;
   in response to determining that the receiving terminal or the receiving device corresponding to the user plane data is located in the radio access network constructed on basis of the second mobile communication technology standard, determine that it is necessary to transmit the user plane data through the radio access network constructed on basis of the second mobile communication technology standard; and
   send, by the PDCP layer function entity, the user plane data in the first format to the aggregation adaptation layer function entity; and
   wherein the aggregation adaptation layer function entity is configured to:
   convert the user plane data in the first format into user plane data in a second format, the second format referring to a format specified by the second mobile communication technology standard; and
   send the user plane data in the second format to a BS in the radio access network constructed on the basis of the second mobile communication technology standard.

2. The BS according to claim 1, wherein the first mobile communication technology standard is a Long Term Evolution (LTE) technology standard, and the second mobile communication technology standard is a 5th Generation (5G) technology standard.

3. The BS according to claim 1, wherein the first mobile communication technology standard is a 5G technology standard, and the second mobile communication technology standard is a Long Term Evolution (LTE) technology standard.

4. The BS according to claim 1, wherein the aggregation adaptation layer function entity is configured to analyze the data packet of the user plane data in the first format to obtain data content; and package the data content to obtain a data packet of the user plane data in the second format according to the second format.

5. The BS according to claim 1, wherein the PDCP layer function entity is configured to receive user plane data in the first format, which is sent by a core network device, determine whether it is necessary to transmit the user plane data through the radio access network constructed on the basis of the second mobile communication technology standard or not, and if YES, send the user plane data in the first format to the aggregation adaptation layer function entity.

6. The BS according to claim 1, wherein the PDCP layer function entity is configured to receive user plane data in the first format, which is sent by a terminal and sequentially transmitted through the PHY layer function entity, the MAC layer function entity and the RLC layer function entity, determine whether it is necessary to transmit the user plane data through the radio access network constructed on the basis of the second mobile communication technology standard or not, and if YES, send the user plane data in the first format to the aggregation adaptation layer function entity.

7. A method for data transmission, the method comprising:
   receiving, by a Base Station (BS) in a radio access network constructed on the basis of a first mobile communication technology standard, user plane data in a first format, the first format referring to a format specified by the first mobile communication technology standard;
   determining, according to a destination Internet Protocol (IP) address extracted from a data packet of the user plane data in the first format, whether a receiving terminal or a receiving device corresponding to the user plane data is located in a radio access network constructed on the basis of a second mobile communication technology standard;
   in response to determining that the receiving terminal or the receiving device corresponding to the user plane data is located in the radio access network constructed on basis of the second mobile communication technology standard, determining that it is necessary to transmit the user plane data through the radio access network constructed on the basis of the second mobile communication technology standard;
   converting, by the BS, the user plane data in the first format into user plane data in a second format, the second format referring to a format specified by the second mobile communication technology standard; and
   sending, by the BS, the user plane data in the second format to a BS in the radio access network constructed on the basis of the second mobile communication technology standard.

8. The method according to claim 7, wherein the first mobile communication technology standard is a Long Term Evolution (LTE) technology standard, and the second mobile communication technology standard is a 5th Generation (5G) technology standard.

9. The method according to claim 7, wherein the first mobile communication technology standard is a 5G technology standard, and the second mobile communication technology standard is a Long Term Evolution (LTE) technology standard.

10. The method according to claim 7, wherein converting the user plane data in the first format into the user plane data in the second format comprises:
    analyzing the data packet of the user plane data in the first format to obtain data content; and packaging the data content to obtain a data packet of the user plane data in the second format according to the second format.

11. The method according to claim 7, wherein receiving the user plane data in the first format comprises:
receiving user plane data in the first format, which is sent by a core network device.

12. The method according to claim 7, wherein receiving the user plane data in the first format comprises:
receiving user plane data in the first format, which is sent by a terminal.

13. A Base Station (BS), deployed in a radio access network constructed on the basis of a first mobile communication technology standard, and comprising:
a processor; and
a memory configured to store instructions executable by the processor, wherein the processor is configured to:
receive user plane data in a first format, the first format referring to a format specified by the first mobile communication technology standard;
determine, according to a destination Internet Protocol (IP) address extracted from a data packet of the user plane data in the first format, whether a receiving terminal or a receiving device corresponding to the user plane data is located in a radio access network constructed on the basis of a second mobile communication technology standard or not;
in response to determining that the receiving terminal or the receiving device corresponding to the user plane data is located in the radio access network constructed on basis of the second mobile communication technology standard, determine that it is necessary to transmit the user plane data through the radio access network constructed on the basis of the second mobile communication technology standard;
convert the user plane data in the first format into user plane data in a second format, the second format referring to a format specified by the second mobile communication technology standard; and
send the user plane data in the second format to a BS in the radio access network constructed on the basis of the second mobile communication technology standard.

14. The BS according to claim 13, wherein the first mobile communication technology standard is one of a Long Term Evolution (LTE) technology standard and a 5th Generation (5G) technology standard; and
wherein the first mobile communication technology standard is different from the second mobile communication technology standard.

15. The BS according to claim 13, wherein the processor is further configured to:
analyze the data packet of the user plane data in the first format to obtain data content; and
package the data content to obtain a data packet of the user plane data in the second format according to the second format.

16. The BS according to claim 13, wherein the processor is further configured to:
receive user plane data in the first format that is sent by one of a core network device and a terminal.

* * * * *